US007730315B2

(12) United States Patent
Lauter et al.

(10) Patent No.: US 7,730,315 B2
(45) Date of Patent: Jun. 1, 2010

(54) CRYPTOSYSTEM BASED ON A JACOBIAN OF A CURVE

(75) Inventors: Kristin E. Lauter, La Jolla, CA (US); Peter L. Montgomery, Bellevue, WA (US); Ramarathnam Venkatesan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1081 days.

(21) Appl. No.: 11/275,215

(22) Filed: Dec. 19, 2005

(65) Prior Publication Data

US 2007/0192397 A1      Aug. 16, 2007

Related U.S. Application Data

(63) Continuation of application No. 09/886,147, filed on Jun. 20, 2001, now Pat. No. 7,020,776.

(60) Provisional application No. 60/213,573, filed on Jun. 22, 2000.

(51) Int. Cl.
*H04L 9/00* (2006.01)
(52) U.S. Cl. .................. 713/176; 713/180; 380/28; 380/30
(58) Field of Classification Search .................. None
See application file for complete search history.

(56) References Cited

U.S. PATENT DOCUMENTS

| 5,559,884 | A | 9/1996 | Davidson et al. |
|---|---|---|---|
| 5,724,425 | A | 3/1998 | Chang et al. |
| 6,163,841 | A | 12/2000 | Venkatesan et al. |
| 6,209,093 | B1 | 3/2001 | Venkatesan et al. |
| 6,845,395 | B1 | 1/2005 | Blumenau et al. |
| 2002/0018560 | A1 | 2/2002 | Lauter et al. |
| 2004/0001590 | A1 | 1/2004 | Eisentraeger et al. |
| 2004/0005054 | A1 | 1/2004 | Montgomery et al. |
| 2005/0025311 | A1 | 2/2005 | Eisentraeger et al. |

OTHER PUBLICATIONS

Menezes et al., Handbook of Applied Cryptography, 1997, CRC Press LLC, pp. 294-298, Section 8.4 ElGamal public-key encryption.*

Menezes et al., Handbook of Applied Cryptography, 1997, CRC Press LLC, pp. 294-298, Section 8.4 ElGamal public-key encryption, and pp. 454-459, Section 11.5.2, The ElGamal Signature Scheme.*

(Continued)

*Primary Examiner*—Jung Kim
(74) *Attorney, Agent, or Firm*—Lee & Hayes, PLLC (57) ABSTRACT

A cryptosystem has a secret based on an order of a group of points on a Jacobian of a curve. In certain embodiments, the cryptosystem is used to generate a product identifier corresponding to a particular product. The product identifier is generated by initially receiving a value associated with a copy (or copies) of a product. The received value is padded using a recognizable pattern, and the padded value is converted to a number represented by a particular number of bits. The number is then converted to an element of the Jacobian of the curve, and the element is then raised to a particular power. The result of raising the element to the particular power is then compressed and output as the product identifier. Subsequently, the encryption process can be reversed and the decrypted value used to indicate validity and/or authenticity of the product identifier.

10 Claims, 7 Drawing Sheets

OTHER PUBLICATIONS

Koblitz, Neal: Algebraic Aspects of Cryptography, 1998, Springer-Verlag Berline Heidelberg, vol. 3, Chapter 6 and appendex.

Schneier, Bruce, Applied Cryptography, 1996, John Wiley & Sons, 2nd Edition, Chapter 18.

Encinas, et al., "Isomorphism Classes of Genus-2 Hyperelliptic Curves Over Finite Fields" Application Algebra in Engineering, Communication and Computing, vol. 13 Issue 1, Apr. 2002, pp. 1-11.

Hess, et al., "Two Topics in Hyperelliptic Cryptography", pp. 181-189 of Selected Areas in Cryptography, Aug. 2001, Serge Vandenay and Amr. M. Youssef (Eds.), LNCS 2259, Springer-Verlag, Aug. 2001.

Lange, "Efficient Arithmetic on Genus 2 Hyperelliptic Curves over Finite Fields via Explicit Formulae", University of Bochum, Germany. Dec. 15, 2003, pp. 1-13.

Menezes, "Elliptic Curve Public Key Cryptosystems", Kluwer Academic Publishers. pp. 8 & 116, Jul. 1993.

Rosing, "Implementing Elliptic Curve Cryptography", Manning Publications Co. Aug. 1999, pp. 171-174, 297-300.

Stahlke, "Point Compression on Jacobians of Hyperelliptic Curves over Fp" 2004. [http://eprint.iacr.org/2004/030.pdf].

Weisstein, et al., "Hyperelliptic Curve" From MathWorld—A Wolfram Web Resource. Available at http://mathworld.wolfram.com/HyperellipticCurve.html, last updated Feb. 2, 2010, 1 page.

* cited by examiner

CRYPTOSYSTEM BASED ON A JACOBIAN OF A CURVE

RELATED APPLICATIONS

This application is a continuation of U.S. patent application Ser. No. 09/886,147, filed Jun. 20, 2001, which is hereby incorporated by reference herein. U.S. patent application Ser. No. 09/886,147 claims priority to and the benefit of U.S. Provisional Application No. 60/213,573, filed Jun. 22, 2000, entitled "Short Product ID", to Kristin E. Lauter, Peter L. Montgomery, and Ramarathnam Venkatesan.

TECHNICAL FIELD

This invention relates to cryptography, and more particularly to cryptosystems based on a Jacobian of a curve.

BACKGROUND OF THE INVENTION

As computers have become increasingly commonplace in homes and businesses throughout the world, and such computers have become increasingly interconnected via networks (such as the Internet), security and authentication concerns have become increasingly important. One manner in which these concerns have been addressed is the use of a cryptographic technique involving a key-based cipher. Using a key-based cipher, sequences of intelligible data (typically referred to as plaintext) that collectively form a message are mathematically transformed, through an enciphering process, into seemingly unintelligible data (typically referred to as ciphertext). The enciphering can be reversed, allowing recipients of the ciphertext with the appropriate key to transform the ciphertext back to plaintext, while making it very difficult, if not nearly impossible, for those without the appropriate key from recovering the plaintext.

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a plaintext message using encryption to a receiving party, an originating party encrypts the plaintext message into a ciphertext message using the public key of the receiving party and communicates the ciphertext message to the receiving party. Upon receipt of the ciphertext message, the receiving party decrypts the message using its secret private key, and thereby recovers the original plaintext message.

The RSA (Rivest-Shamir-Adleman) method is one well-known example of public/private key cryptology. To implement RSA, one generates two large prime numbers p and q and multiplies them together to get a large composite number N, which is made public. If the primes are properly chosen and large enough, it will be practically impossible (i.e., computationally infeasible) for someone who does not know p and q to determine them from just knowing N. However, in order to be secure, the size of N typically needs to be more than 1,000 bits. In some situations, though, such a large size makes the numbers too long to be practically useful.

One such situation is found in authentication, which can be required anywhere a party or a machine must prove that it is authorized to access or use a product or service. An example of such a situation is in a product ID system for a software program(s), where a user must enter a product ID sequence stamped on the outside of the properly licensed software package as proof that the software has been properly paid for. If the product ID sequence is too long, then it will be cumbersome and user unfriendly.

Additionally, not only do software manufacturers lose revenue from unauthorized copies of their products, but software manufacturers also frequently provide customer support, of one form or another, for their products. In an effort to limit such support to their licensees, customer support staffs often require a user to first provide the product ID associated with his or her copy of the product for which support is sought as a condition for receiving support. Many current methods of generating product IDs, however, have been easily discerned by unauthorized users, allowing product IDs to be generated by unauthorized users.

Given the apparent ease with which unauthorized users can obtain valid indicia, software manufacturers are experiencing considerable difficulty in discriminating between licensees and such unauthorized users in order to provide support to the former while denying it to the latter. As a result, manufacturers often unwittingly provide support to unauthorized users, thus incurring additional and unnecessary support costs. If the number of unauthorized users of a given software product is sufficiently large, then these excess costs associated with that product can be quite significant. Therefore, a need exists in the art for a technique that permits a software manufacturer to appreciably reduce the incidence of unauthorized copying of its software product, but which is not based on user entry of impractically long data sequences.

The invention addresses these problems and provides a cryptosystem based on a Jacobian of a curve.

SUMMARY OF THE INVENTION

A cryptosystem based on a Jacobian of a curve is described herein.

In accordance with one aspect, encryption and decryption are performed based on a secret. This secret is the order of a group of points on a Jacobian of a curve. A variety of different curves can be used, and in one implementation the curve is a hyperelliptic curve over a finite field.

According to another aspect, the cryptosystem is used to generate a product identifier corresponding to a particular copy (or copies) of a product. The product identifier is generated by initially receiving a value associated with one copy (or alternatively multiple copies) of a product. The received value is then padded using a recognizable pattern, and the padded value is converted to a number represented by a particular number of bits. The number is then converted to an element of the Jacobian of a curve, which in turn is raised to a particular power. The result of raising the element to the particular power is then compressed and output as the product identifier.

According to another aspect, the generated product identifier can be validated (e.g., during installation of the product) by reversing the encryption process and extracting the padded value. If a correct recognizable pattern is included in the padded value, then the product identifier is a valid product identifier. Otherwise, it is not. Furthermore, if the product identifier generation process was based on unique values for each copy of a product, then that unique value can also be extracted from the padded value and compared (e.g., by the product manufacturer) to determine whether it corresponds to the actual product (e.g., the product for which installation is being attempted, or for which service or support is being requested). If the product identifier does correspond to the actual product, then the product identifier is authenticated (otherwise, it is not authenticated).

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The discussions herein assume a basic understanding of cryptography by the reader. For a basic introduction of cryptography, the reader is directed to a book written by Bruce Schneier and entitled "Applied Cryptography: Protocols, Algorithms, and Source Code in C," published by John Wiley & Sons with copyright 1994 (or second edition with copyright 1996).

Described herein is a curve-based cryptosystem that is based on groups whose size is known to the cryptosystem designer but unknown and believed difficult to determine for attackers of the cryptosystem. The curve-based encryption and decryption described herein refers to encryption and decryption that uses keys that are generated based on aspects or characteristics of a mathematical curve. The curve-based cryptosystem is based on the Jacobian of the curve being used, and the secret group size is the size of the group of points on the Jacobian of the curve. The curve-based cryptosystem can be used to encrypt any of a wide variety of information, and is described herein primarily with respect to generation of a "short" signature or product identifier, which is a code that allows validation and/or authentication of a machine, program, user, etc. The signature is a "short" signature in that it uses a relatively small number of characters.

Figure 1:
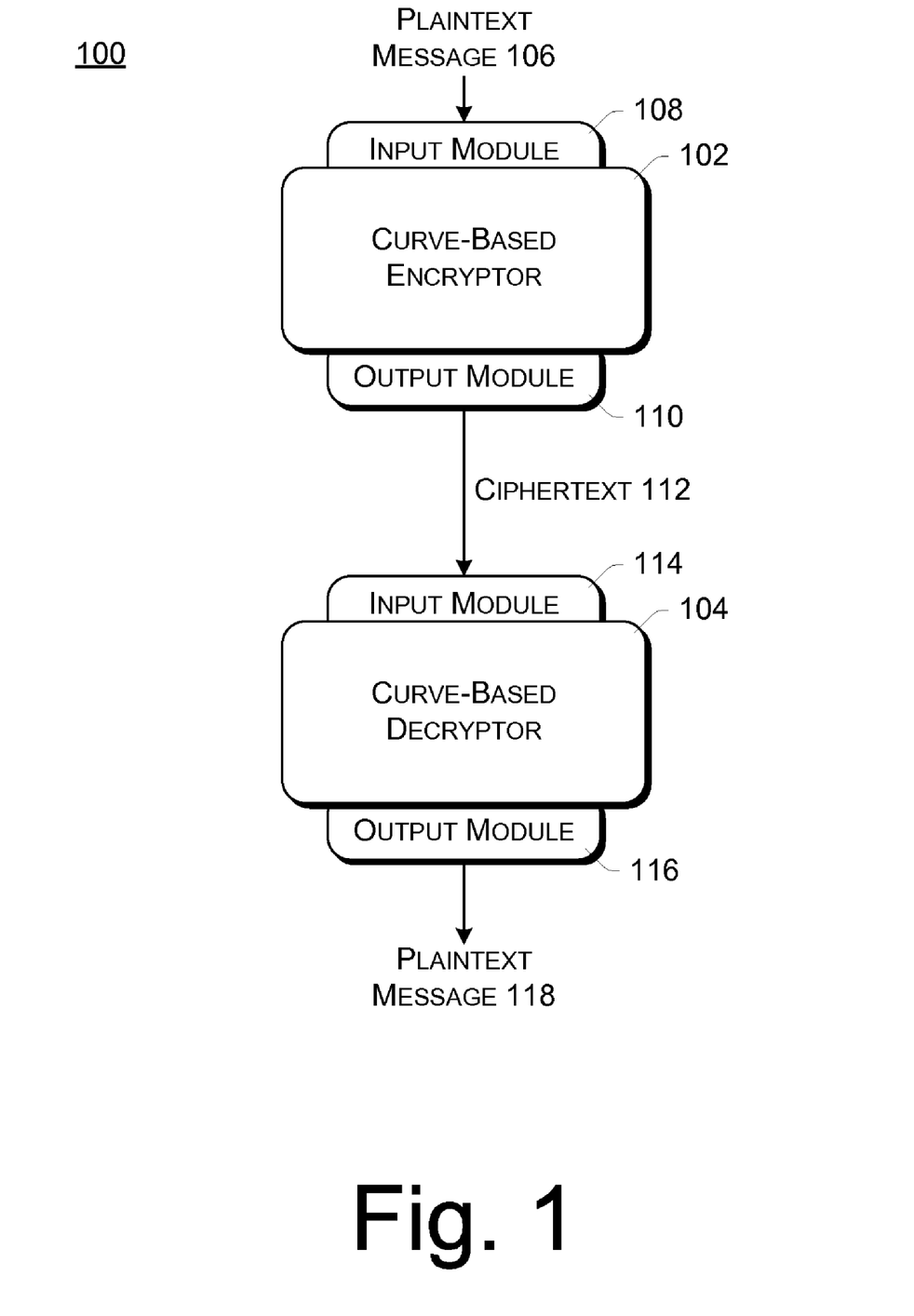
FIG. 1 is a block diagram illustrating an exemplary cryptosystem in accordance with certain embodiments of the invention.

FIG. 1 is a block diagram illustrating an exemplary cryptosystem in accordance with certain embodiments of the invention. The cryptosystem 100 includes an encryptor 102 and a decryptor 104. A plaintext message 106 is received at an input module 108 of encryptor 102, which is a curve-based encryptor that encrypts message 106 based on a public key generated based on a secret group size (known only by decryptor 104). This secret group size is the size of the group of points on the Jacobian of the curve being used, and is discussed in more detail below. Plaintext message 106 is typically an unencrypted message, although encryptor 102 can encrypt any type of message. Thus, message 106 may alternatively be encrypted or encoded by some other component (not shown) or a user.

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure (it is typically presumed that the communication link is not secure). The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret group size used to encrypt message 106 (as well as the necessary exponent), is able to readily decrypt ciphertext 112 to recover the original plaintext message 106, which is output by output module 116 as plaintext message 118. Decryptor 104 is a curve-based decryptor that decrypts the message based on the size of the group of points on the Jacobian of the curve (the same value as was used by encryptor 102), and is discussed in more detail below.

Encryption and decryption are performed in cryptosystem 100 based on a secret, which is the size of the group of points on the Jacobian of curve. This secret is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret and based on a plaintext message, a process referred to as digitally signing the plaintext message. This signed message can then be communicated to other components, such as encryptor 102, which can in turn verify the digital signature based on the public key.

Figure 2:
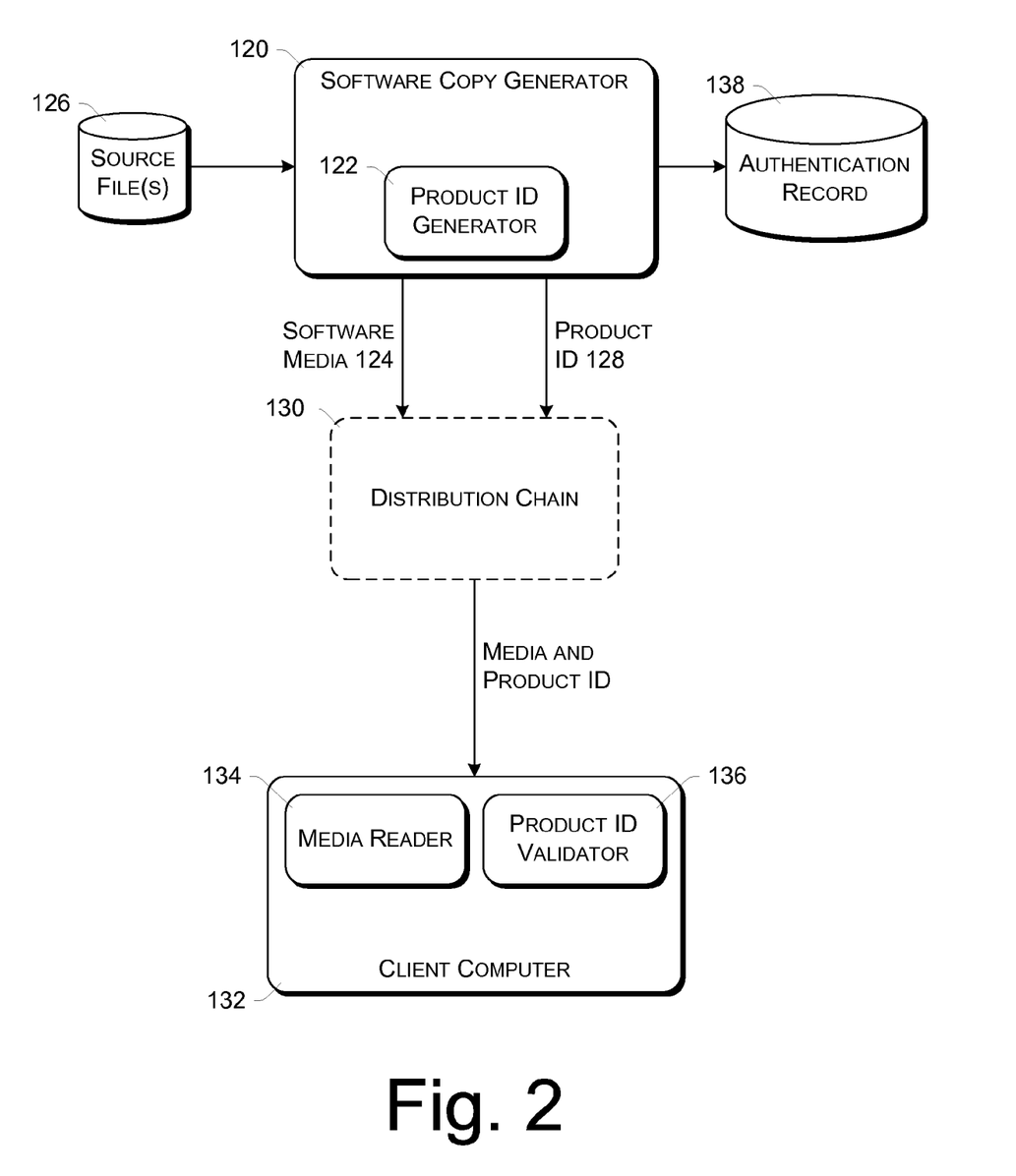
FIG. 2 illustrates an exemplary system using a product identifier to validate software in accordance with certain embodiments of the invention.

FIG. 2 illustrates an exemplary system using a product identifier to validate software in accordance with certain embodiments of the invention. FIG. 2 illustrates a software copy generator 120 including a product identifier (ID) generator 122. Software copy generator 120 produces software media 124 (e.g., a CD-ROM, DVD (Digital Versatile Disk), etc.) that contains typically all the files needed to collectively implement a complete copy of one or more application programs, (e.g., a word processing program, a spreadsheet program, an operating system, a suite of programs, and so forth). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption process described herein. The product ID 128 is typically printed on a label and affixed to either a carrier containing software media 124 or a box into which software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar), etc.). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID therefrom). Client computer 132 also includes a product ID validator 136 which validates, during installation of the application program, the product ID 128. This validation is performed using the curve-based decryption described herein. If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application be accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program is unique. This uniqueness is created by assigning a different initial number or value to each copy of the application program (this initial value is then used as a basis for generating the product ID, as discussed in more detail below). The unique value associated with the copy of the application program is then optionally maintained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners. Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur. For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

Figure 3:
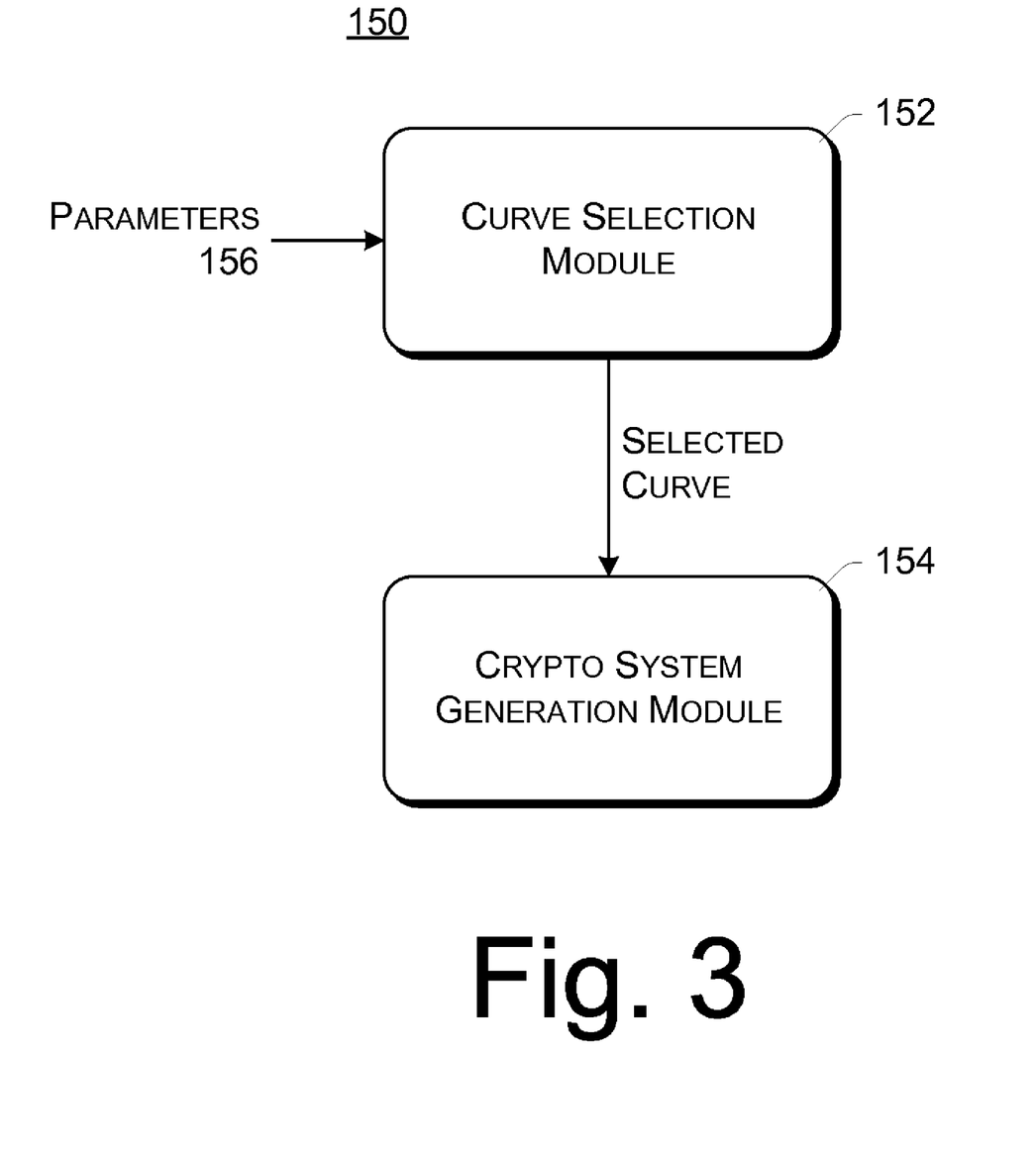
FIG. 3 illustrates an exemplary cryptographic system generator in accordance with certain embodiments of the invention.

FIG. 3 illustrates an exemplary cryptographic system generator in accordance with certain embodiments of the invention. The generator system 150 generates a cryptosystem based on a secret that is the size of a group of points on the Jacobian of a curve. The cryptosystem generated by system 150 can be used, for example, to implement the system 100 in FIG. 1 or the product ID based system of FIG. 2. The system 150 includes a curve selection module 152 and a cryptographic system generation module 154. Curve selection module 152 receives a set of one or more parameters 156 as inputs and selects a curve to be used based on the parameters 156. In one implementation, parameters 156 include an indication of the genus of the curve and a size (e.g., in bits) that the product identifier should be. Curve selection module 152 can then select a curve based on these parameters in any of a variety of well-known manners. In one implementation the selected curve is a hyperelliptic curve, although in alternate implementations other curves may be used. Curve selection module 152 then provides the selected curve to cryptographic system generation module 154. Cryptographic system generation module 154 generates the cryptographic system, determining the group and the size of the group (which is the secret that is being maintained).

More specifically, curve selection module 152 selects a hyperelliptic curve given by the equation $y^2=f(x)$, referred to herein as the equation C, over a finite field $F\_p$, where p is a prime number and where f is a polynomial of degree $2 \cdot g+1$ and g is the genus of the hyperelliptic curve. The genus of the curve may be any of a variety of values, and in one implementation the genus is at least 2. Given this selected curve, cryptographic system generation module 154 determines the Jacobian $J(C)$ over the finite field $F\_p$ for the curve. The group of points on the Jacobian $J(C)$ is denoted by $J(C)(F\_p)$, and the order of $J(C)(F\_p)$, also referred to as the size of $J(C)(F\_p)$ or the number of elements in $J(C)(F\_p)$, is secret. The order of $J(C)(F\_)$ can be selected by the cryptosystem designer and made available to cryptosystem generation module 154 (e.g., as one of parameters 156, or alternatively separately).

An element of the group $J(C)$ is called a divisor on the curve, and it is given as a pair of polynomials $(a(x),b(x))$ where $degree(a) \leq g$, where $degree(b) < degree(a)$, and where $a(x)$ divides $(b(x)^2 - f(x))$. Each element in the group $J(C)$ has a unique $(a(x),b(x))$ if $a(x)$ is required to be monic (which it is in one implementation). Alternatively, $b(x)$ could be replaced with $b(x)+$(some multiple of $a(x)$), which also results in each element in the group $J(C)$ having a unique $(a(x),b(x))$ if $degree(b(x)) < degree(a(x))$. Addition of elements of the Jacobian is performed via operations on the polynomials $a(x)$ and $b(x)$. For ease of understanding, the Jacobian of a curve can be thought of as a multiset with at most g points on the curve, where g is the genus of the curve. These points on the curve can lie in an algebraic extension of the finite field, and the multiset does not include both a point and its negative.

The generation of the Jacobian of a curve, as well as performing operations in the Jacobian, are well-known to those skilled in the art. However, for additional information on Jacobians, the reader is directed to David Mumford, *Tata Lectures on Theta*, Volume 2 (Birkhauser 1984), and American Mathematical Society journal, *Mathematics of Computation*, Volume 48, number 177, January 1987, pp 95-101.

Knowing how to perform group operations on the Jacobian, an element P of the Jacobian can be raised to a publicly available exponent e (that is, $P^e$), with this result $P^e$ also being on the Jacobian. The value $P^e$ can then be transmitted over a non-secure communication link (or stored in a non-secure manner), and the privacy of the value P maintained because an attacker cannot readily recover P without knowing the secret group size (the order of J(C)(F_p)). If the group size is known, however, then a value d can be readily determined so that the value $P^e$ can be raised to the value d (that is, $(P^e)^d$), which recovers the value of P. It is very difficult (computationally infeasible) to recover the value of P based on the value $P^e$ without knowing the secret group size.

The value of e can be any value, but larger prime values typically provide greater security. In one implementation, the value of e is 65,537. The value of d can be readily determined by solving for d such that e·d=1 mod |G|, where |G| refers to the secret group size (that is, to the order of J(C)(F_p)).

A point P that is on the Jacobian can be digitally signed in an analogous manner. The point P is raised to the secret exponent d (that is, $P^d$). The value $P^d$ can then be communicated or otherwise made available to another device that knows the publicly available exponent e. The value of P can then be recovered by raising the value $P^d$ to the value e (that is, $(P^d)^e$) However, without knowing the secret group size, a false value $P^d$ that resulted in a valid value of P could not be created by an attacker because the attacker could not generate the value d.

Figure 4:
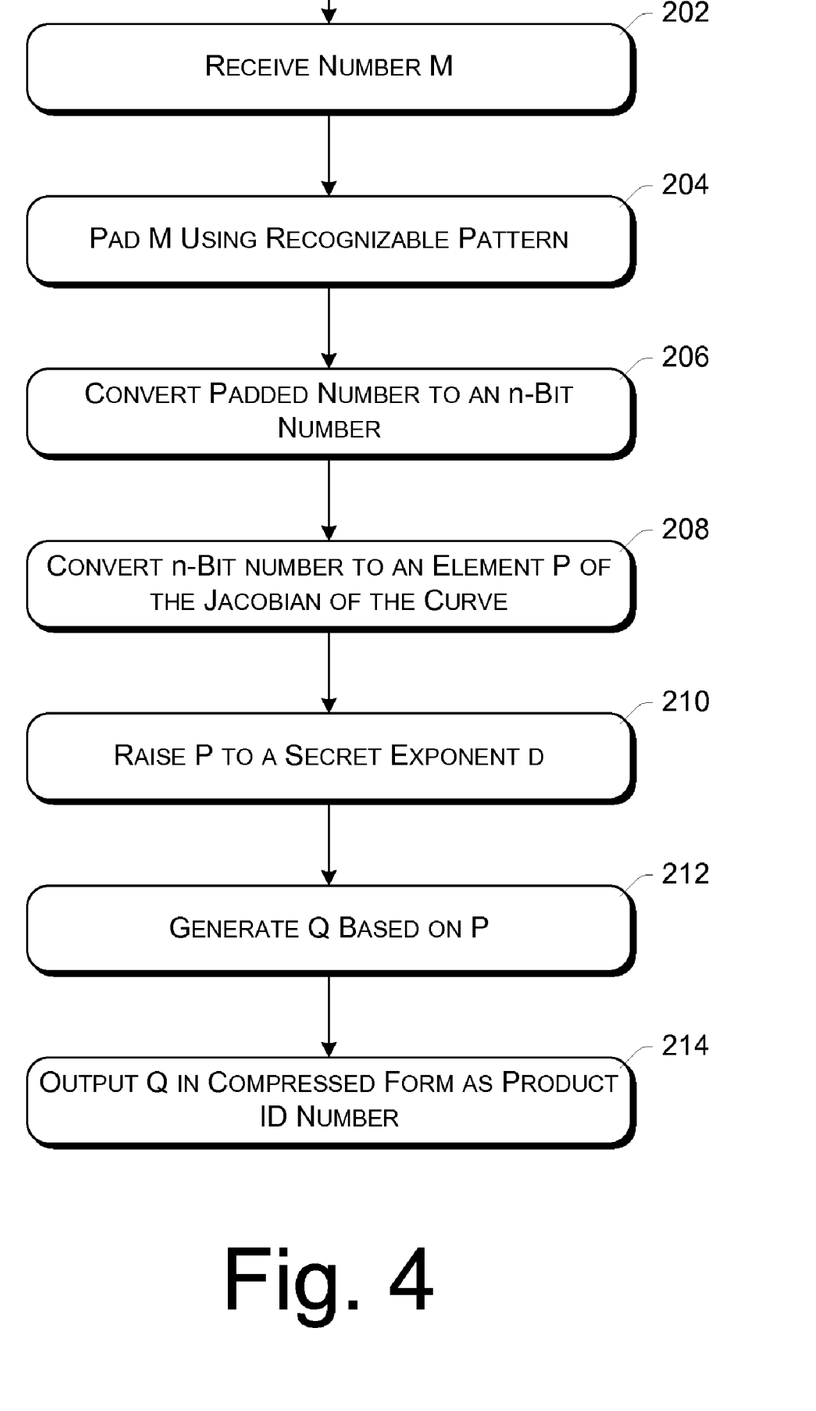
FIG. 4 is a flowchart illustrating an exemplary process for generating a product ID number in accordance with certain embodiments of the invention.

FIG. 4 is a flowchart illustrating an exemplary process for generating a product ID number in accordance with certain embodiments of the invention. The process of FIG. 4 is implemented by product ID generator 122 of FIG. 2, and may be performed in software. The process of FIG. 4 replaces RSA with a signature scheme that produces a product ID short enough for practical use while still providing adequate security against attack. This scheme produces a signature based on a secret, with the secret being the order of a group of points on the Jacobian of a curve.

Initially, a number M is received (act 202). Each number M is associated with a particular copy of a product for which the product IDs are being generated. The number of bits in M can vary, but should be large enough so that a unique number M can be assigned to each copy of the product. In one implementation, the number M is approximately 64 bits. By assigning a unique number M to each copy of the product, the individual products can subsequently be identified (based on the product ID number, as discussed below). Alternatively, if identification of the individual copies is not needed or desired, then M need not be unique for each copy of the product.

The value of M is then padded with a recognizable pattern (act 204) and converted to an n-bit number (act 206). Any of a variety of recognizable patterns can be used, and in one implementation the recognizable pattern is generated by repeating at least a portion of the number M. This recognizable pattern can be subsequently used during decryption to verify the validity of a product ID, as discussed below. In one implementation, the value of n is 114, so the padded value is converted to a 114-bit number (in alternate implementations, the value of n can be different, such as 112 (or alternatively much larger or smaller than 114)). The value of 114 provides for approximately $24^{25}$ different sequences of numbers, allowing a product ID to be 25 characters (thus requiring a user to enter only 25 key strokes), each of which can be one of 24 different characters (including letters, numbers, and symbols). Alternatively, only the digits 0 through 9 may be used, which reduces the number of different sequences that can be entered using 24 characters, but also reduces the number of different characters that a user may need to enter.

Figure 5:
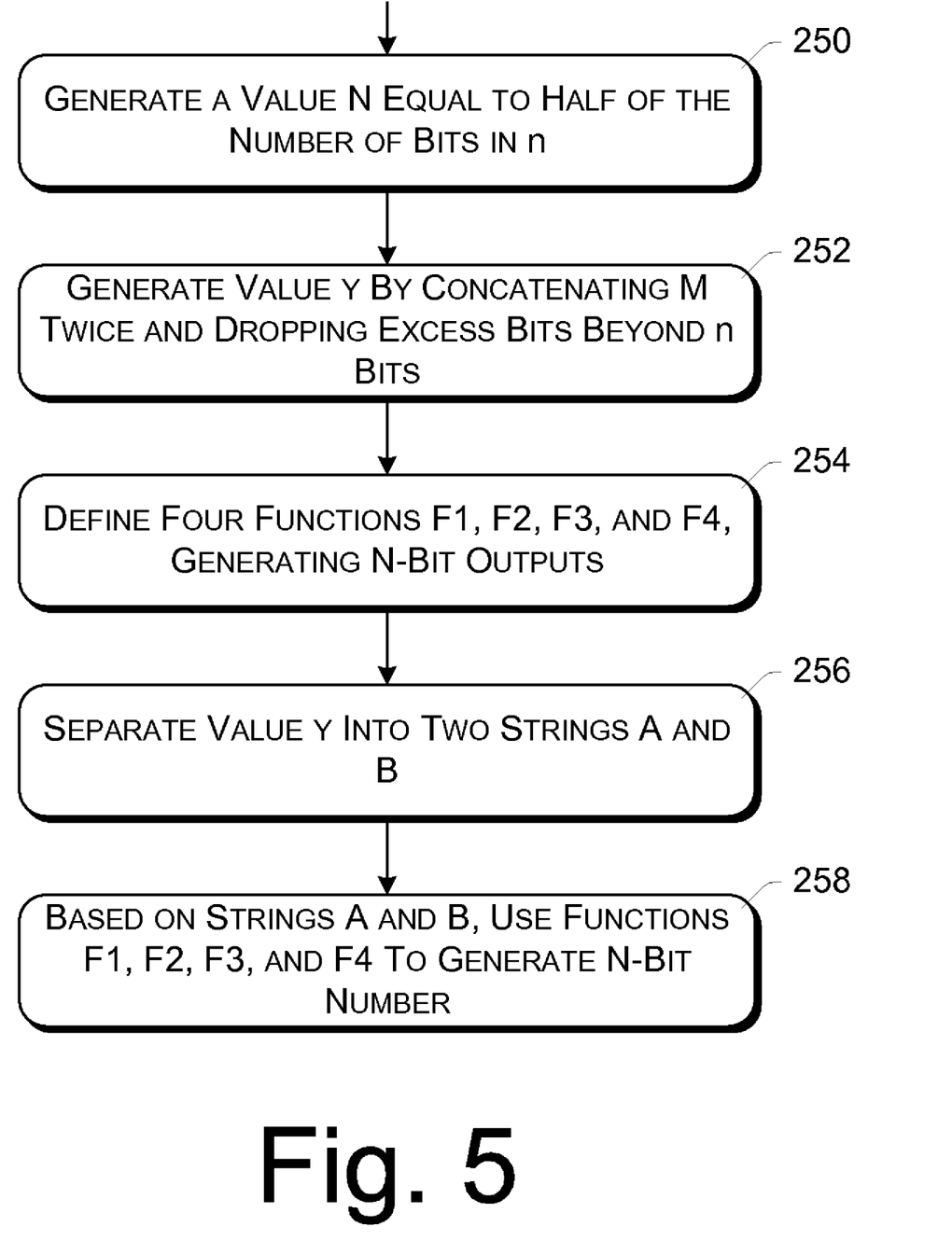
FIG. 5 is a flowchart illustrating portions of the process of FIG. 4 in additional detail.

FIG. 5 is a flowchart illustrating an exemplary implementation of acts 204 and 206 in additional detail. First, a value of N is set as n/2 (act 250). So, assuming a value of n=114, the value of N is 57. A value y (also referred to as the padded version of M) is then calculated based on the received value M (act 252). The value y is calculated by concatenating x (where x=M) twice and dropping the bits in excess of n. In one implementation, the most significant excess bits are dropped (alternatively, the least significant excess bits may be dropped). Thus, assuming a value of n=114 and M is 64 bits, the value x would be concatenated with itself to create a 128-bit number, and the fourteen most significant bits dropped.

Then four functions F1, F2, F3, and F4 are defined (act 254), with the functions F1, F2, F3, and F4 mapping L-bit inputs to N-bit outputs in a random (or seemingly random) manner. In one implementation, these four functions F1, F2, F3, and F4 is each assumed to have N-bit outputs where N is less than L:

F1(x)=LSB_N [H(K,1,x)]
F2(x)=LSB_N [H(K,2,x)]
F3(x)=LSB_N [H(K,3,x)]
F4(x)=LSB_N [H(K,4,x)]

In F1, F2, F3, and F4, the value H is a secure hash function (e.g., SHA, MD5, etc.) having L bits of output, the value x is the input value for the function, the other inputs to H (K,1; K,2; K,3; and K,4) each represent a random (or pseudo-random) cryptographic key (in one implementation at least 100 bits long), and LSB_N(W) means output the N least significant bits of W. The cryptographic keys input to H (K,1; K,2; K,3; and K,4) are each different (although alternatively one or more may be the same) and can be of differing lengths). The use of these functions F1, F2, F3, and F4 are discussed in more detail below.

An input string is then defined as two strings A,B (act 256) each of N bits, and each of A,B having half the bits of the value y (e.g., A being the n/2 most significant bits and B being the n/2 least significant bits). Next, a function is used that accepts two N-bit input strings and outputs a 2N-bit string (act 258). The outputs will be presumably random-looking. The function is defined using the following pseudocode that employs concurrent assignments (all assignments on one line are done concurrently):

(L, R)=(A, B);
(L, R)=(R, F1(R)+L mod 2^N);
(L, R)=(R, F2(R)+L mod 2^N);
(L, R)=(R, F3(R)+L mod 2^N);
(L, R)=(R, F4(R)+L mod 2^N);
Output L, R.

The final output of L,R is the mapping that converts the padded number into n bits, providing the n-bit number in act 206.

Returning to FIG. 4, given the n-bit number from act 206, the n-bit number is converted to an element P of the Jacobian of the curve (act 208). The value of n (e.g., 114) is approximately the length of g field elements minus a few bits used for point compression depending on g. If g=2, then only one bit is needed for compression. Thus, p is approximately n/g bits long, and the order of the group is approximately $p^g$ elements.

In act 208, the n-bit number is converted to the coefficients of a monic irreducible polynomial a(x) of degree g, where the curve is given by the equation $y^2 = f(x)$, where f(x) has degree $2 \cdot g+1$, and where a(x) is monic. There are approximately $p^g/g$ possible a(x). The expression $b(x)^2 = f(x) \mod a(x)$ is then solved for b(x). In other words, a square root is found of f(x) modulo a(x). The square root may not always exist, so if it does not, a new n-bit number is generated by generating new values of A,B in act 256 of FIG. 5. In one implementation, the value of A remains unchanged but the value of B is modified to change one or more of the last bits of B (e.g., by incrementing the value of B by one (or alternatively by some other amount)). The process then continues (at act 258) with the new values of A,B, and act 208 is repeated with the new n-bit number. When g is odd, the existence of a square root can be guaranteed by using two dual curves $y^2 = f(x)$ and $y^2 = cf(x)$, where c is a quadratic non-residue modulo p. An alternative method is to convert the n-bit number to the polynomial b(x) and then identify an a(x) of the appropriate degree dividing $(b(x)^2 - f(x))$. Regardless of the method used, the element P is then (a(x), b(x)).

The element P is then raised to the power of a secret exponent value d (act 210). Assuming a public exponent e is fixed, and J is the order of the group of points on the Jacobian of the curve over the field F_p, then the value d is computed as the inverse of e modulo J. The element P raised to the power of d refers to the element P being added to itself d times in the group J(C). The value Q is set as the value P raised to the power of d (act 212), with $Q = P^d = (q1(x), q2(x))$.

The value Q is then output in compressed form as the product ID number (214). The value Q includes the coefficients of q1(x) with a few extra bits to specify q2(x). Q is output in compressed form by taking the g coefficients of q1(x) plus the extra bits needed to specify q2(x). q1 is assumed to be monic. Details in an exemplary case where g=2 are as follows: q1(x) is either quadratic split, quadratic irreducible, linear, or constant (equals the identity in the group), depending on its degree and its factorization over the base field. An exemplary implementation of g=2 compression uses two values r1, r2 with $0 <= r1 <= p$ and $0 <= r2 <= (3p-1)/2$, plus a sign bit s, which is (p+1)(3p+1) possible values. Fix a quadratic non-residue c in the field GF(p). The cases are:

$$0 <= r1, r2 < p \quad (1)$$

The tuple (r1, r2, s) is a compression in which the quadratic $q1(x) = (x+r1)(x+r2)$ has two linear factors. When $r1 \neq r2$, the ordering r1<r2 or r2<r1 and the sign bit s together distinguish the (up to) four possible q2(x). When r1=r2, the sign bit s distinguishes the (up to) two possible q2(x).

$$0 <= r1 < p \text{ and } p < r2 <= (3p-1)/2. \quad (2)$$

The tuple (r1, r2, s) is a compression in which $q1(x) = (x+r1)^2 - c(r2-p)^2$ is an irreducible quadratic over GF(p). The sign bit s distinguishes the (up to) two possible q2(x).

$$r2 = p \text{ and } 0 <= r1 < p. \quad (3)$$

The tuple (r1, r2, s) is a compression in which $q1(x) = x + r1$ is linear. The sign bit s distinguishes the (up to) two possible q2(x).

$$r1 = r2 = p \quad (4)$$

The tuple (r1, r2, s) is a compression in which q1(x)=1 (constant) and q2(x)=0. This is the identity element of the Jacobian.

For this application (product IDs), the sign bit s can be suppressed, because $Q1 = (q1(x), q2(x))$ and $Q2 = (q1(x), -q2(x))$ are negatives (inverses) of each other in the Jacobian group. Whether we later compute $Q1^e$ or $Q2^e$ in act 212, its first component a(x) will be the same whether we start with Q1 or Q2, because $Q1^e$ and $Q2^e$ are themselves inverses. By omitting s, the compressed form takes on only (p+1)(3p+1)/2 possible values.

A significant advantage of the cryptosystem described herein is drastically shorter signature length for the same amount of security against attack. The system described herein provides a solution to the problem of short signatures in asymmetric cryptosystems where the parties authenticating one another do not share a previously established private secret key.

Figure 6:
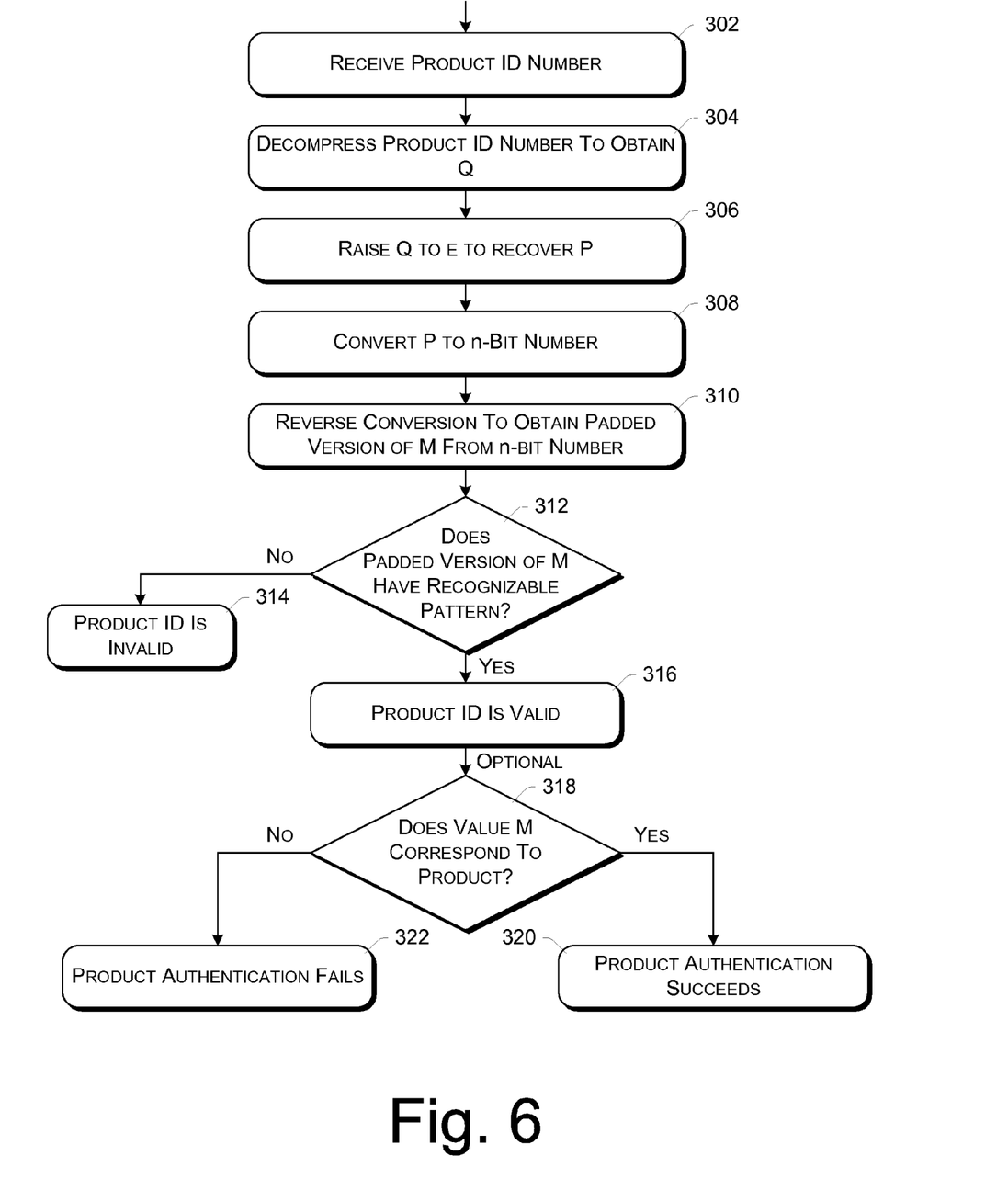
FIG. 6 is a flowchart illustrating an exemplary process for decrypting a product ID number in accordance with certain embodiments of the invention.

FIG. 6 is a flowchart illustrating an exemplary process for decrypting a product ID number in accordance with certain embodiments of the invention. The process of FIG. 4 is implemented by product ID validator 136 of FIG. 2, and may be performed in software. The process of FIG. 6 is the inverse of the process of FIG. 4.

Initially, the product ID number is received (act 302) and decompressed to obtain the divisor Q (act 304). The divisor Q is then raised to the power e in order to recover the value of P (act 306). The value of P is then converted back to an n-bit number (act 308), and the conversion process reversed to obtain the padded version of M from the n-bit number (act 310). The padded version of M is obtained by reversing acts 256 and 258 of FIG. 5 (including reversing the pseudocode discussed with reference to act 258), so the four functions F1, F2, F3, and F4 are used to generate the strings A and B which are then combined (concatenated), resulting in the padded version of M (the value y in act 252).

A check is then made as to whether the padded version of M has the recognizable pattern (act 312). If the padded version of M does not have the recognizable pattern then the received product ID is invalid (act 314). Appropriate action can then be taken, such as to terminate the installation process so that the application cannot be installed on the computer. However, if the padded version does have the recognizable pattern, then the product ID is assumed valid (act 316). Appropriate action can then be taken, such as allowing the installation process to complete.

Additionally, optionally a check may be made as to whether the value M corresponds to the product (act 318). In other words, does the value M correspond to the particular copy of the product that it is allegedly associated with? This checking can be made in a variety of different manners, such as comparing the value M to a serial number embedded in the product.

If the value M does correspond to the product, then the product is successfully authenticated (act 320). However, if the value M does not correspond to the product, then the product is not authenticated (act 322). Appropriate action can then be taken, such as to log (e.g., at the manufacturer) the failed authentication, disable the product, and so on.

Figure 7:
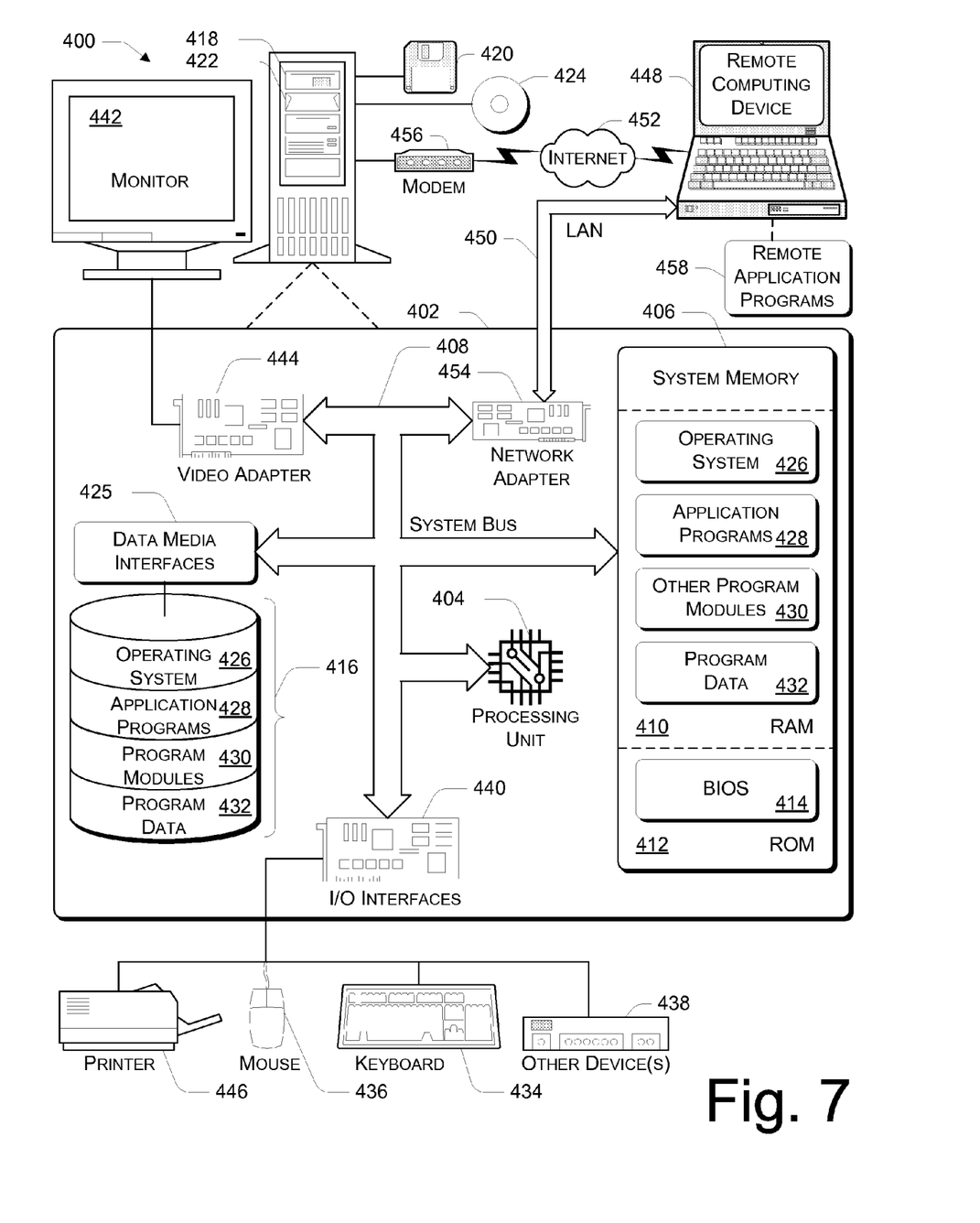
FIG. 7 illustrates a more general exemplary computer environment which can be used in various embodiments of the invention.

FIG. 7 illustrates a more general exemplary computer environment 400, which can be used in various embodiments of the invention. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can implement, for example, encryptor 102 or decryptor 104 of FIG. 1, generator 120 or client computer 132 of FIG. 2, either or both of modules 152 and 153 of FIG. 3, and so forth. Computer 402 represents any of a wide variety of computing devices, such as a personal computer, server computer, handheld or laptop device, multiprocessor system, microprocessor-based system, programmable consumer electronics (e.g., digital video recorders), gaming console, cellular telephone, network PC, minicomputers, mainframe computer, distributed computing environment that include any of the above systems or devices, and the like.

The components of computer 402 can include, but are not limited to, one or more processors or processing units 404, a system memory 406, and a system bus 408 that couples various system components including the processor 404 to the system memory 406. The system bus 408 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 7 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 402. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, and/or firmware. For example, one or more application specific integrated circuits (ASICs) could be designed or programmed to carry out the invention.

Product identifiers generated using a curve-based cryptosystem are described herein. Although discussed primarily with reference to product identifiers for application programs, the product identifiers can be associated with any of a variety of goods, products, services, users, and so forth.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer-readable storage media having stored thereon a plurality of instructions for generating a product identifier, wherein the plurality of instructions, when executed by one or more processors, causes the one or more processors to perform the following acts:
   receiving a value;
   padding the received value using a recognizable pattern;
   converting the padded value to a number represented by a particular number of bits;
   converting the number to an element of the Jacobian of a curve, wherein the curve is given by the equation $y^2=f(x)$, wherein $f(x)$ has a degree of $2 \cdot g+1$, and wherein g refers to the genus of the curve, and wherein converting the number to an element of the Jacobian of a curve comprises:
   determining a value $a(x)$, wherein the value $a(x)$ is a monic irreducible polynomial of degree g;
   determining a value $b(x)$, wherein the value $b(x)$ is a square root of $f(x)$ modulo $a(x)$ of degree less than $a(x)$; and
   using, as the element of the Jacobian of the curve, the values $a(x)$ and $b(x)$;
   raising the element to a particular power;
   compressing the result of raising the element to the particular power; and
   outputting, as the product identifier, the compressed result.

2. One or more computer-readable storage media as recited in claim 1, wherein the receiving comprises receiving a numeric value associated with a copy of a product.

3. One or more computer-readable storage media as recited in claim 1, wherein the recognizable pattern comprises at least a portion of the received value.

4. One or more computer-readable storage media as recited in claim 1, wherein converting the padded value to a number represented by a particular number of bits comprises converting the padded value to a 114-bit number.

5. One or more computer-readable storage media as recited in claim 1, wherein converting the padded value to a number represented by a particular number of bits comprises:
   defining a plurality of functions, wherein each of the plurality of functions returns a value that is a set of bits of a hash value generated based on an input value;
   separating the padded value into a plurality of portions; and
   using the plurality of portions as input values for the plurality of functions.

6. One or more computer-readable storage media as recited in claim 5, wherein each of the plurality of functions returns a set of least significant bits of a hash value generated based on the input.

7. One or more computer-readable storage media as recited in claim 5, wherein the hash value is generated using a secure hashing process.

8. One or more computer-readable storage media as recited in claim 5, wherein the set of bits includes a number of bits equal to half the particular number of bits.

9. One or more computer-readable storage media as recited in claim 5, wherein the separating comprises separating the padded value into two equal portions.

10. One or more computer-readable storage media as recited in claim 1, wherein the curve comprises a hyperelliptic curve.

* * * * *